(12) United States Patent  
Behr

(10) Patent No.: US 8,551,305 B2
(45) Date of Patent: Oct. 8, 2013

(54) APPARATUS FOR TREATING WATER OR WASTEWATER

(75) Inventor: Bernd Leopold Behr, Hoechst (AT)

(73) Assignees: Singapore Technologies Dynamics PTE Ltd, Singapore (SG); Innovum Innovative Umwelttechnik, Hoechst (AT)

( * ) Notice: Subject to any disclaimer, the term of this patent is extended or adjusted under 35 U.S.C. 154(b) by 769 days.

(21) Appl. No.: 12/310,001

(22) PCT Filed: Aug. 7, 2007

(86) PCT No.: PCT/SG2007/000239
§ 371 (c)(1),
(2), (4) Date: Feb. 6, 2009

(87) PCT Pub. No.: WO2008/018837
PCT Pub. Date: Feb. 14, 2008

(65) Prior Publication Data
US 2009/0242424 A1    Oct. 1, 2009

(30) Foreign Application Priority Data

Aug. 8, 2006 (SG) ................................ 200605374-8

(51) Int. Cl.
*C02F 1/46* (2006.01)
(52) U.S. Cl.
USPC ........ 204/267; 204/269; 204/273; 204/275.1; 204/278.5
(58) Field of Classification Search
USPC ..................... 205/267, 269, 273, 275.1, 278.5
See application file for complete search history.

(56) References Cited

U.S. PATENT DOCUMENTS

| 3,944,478 A | 3/1976 | Kuji et al. ...................... 204/275 |
| 4,104,142 A | 8/1978 | King ............................. 204/152 |
| 4,149,953 A | 4/1979 | Rojo ............................. 204/269 |
| 4,181,591 A | 1/1980 | King ............................. 204/275 |
| 4,623,436 A | 11/1986 | Umehara ....................... 204/149 |
| 4,770,755 A | 9/1988 | Valanti et al. ................. 204/225 |
| 5,389,214 A * | 2/1995 | Erickson et al. .............. 205/701 |

(Continued)

FOREIGN PATENT DOCUMENTS

| DE | 885 299 | 7/1949 |
| DE | 88 03 969.2 | 6/1988 |

(Continued)

OTHER PUBLICATIONS

International Search Report from corresponding PCT/SG2007/00239 dated May 8, 2008.

*Primary Examiner* — Arun S Phasge
(74) *Attorney, Agent, or Firm* — Ohlandt, Greeley, Ruggiero & Perle, LLP

(57) ABSTRACT

A method and apparatus for treating water or wastewater for drinking and/or industrial use. The method and apparatus comprises of a plurality of vertically positioned electrodes, which are placed in a treating chamber and wherein the electrodes are interconnected to one another. The positive and negative electrodes are insulated there-between. The polarity of the direct current supply is changeable at regular intervals in order to prevent passivation of the electrodes when reaching an even abrasion. The current can preferably be pulsatory. In order to be able to keep the current density between the electrodes at a desired value, the most efficient possible electrolysis is achieved by means of a minimum total current and wherein the spacing between the electrodes are adjustable.

9 Claims, 5 Drawing Sheets

(56) References Cited

U.S. PATENT DOCUMENTS

| | | | |
|---|---|---|---|
| 5,474,748 A | 12/1995 | Szabo | 422/186.04 |
| 5,730,856 A * | 3/1998 | Omasa | 205/742 |
| 5,807,473 A | 9/1998 | Sadler et al. | 205/743 |
| 5,928,493 A | 7/1999 | Morkovsky et al. | 205/757 |
| 6,122,599 A | 9/2000 | Mehta | 702/100 |
| 6,126,838 A | 10/2000 | Huang et al. | 210/712 |
| 6,174,444 B1 * | 1/2001 | Smit | 210/709 |
| 6,274,028 B1 | 8/2001 | Hu et al. | 205/754 |
| 6,294,061 B1 | 9/2001 | Morkovsky et al. | 204/242 |
| 6,315,887 B1 | 11/2001 | Salama | 205/701 |
| 6,325,916 B1 | 12/2001 | Lambert et al. | 205/751 |
| 6,338,789 B1 | 1/2002 | Hecking | 205/742 |
| 6,613,201 B1 | 9/2003 | Hecking | 204/227 |
| 6,689,271 B2 | 2/2004 | Morkovsky et al. | 205/757 |
| 6,740,245 B2 | 5/2004 | Johnson | 210/748 |
| 6,793,801 B2 | 9/2004 | Holland | 205/742 |
| 6,802,956 B2 * | 10/2004 | Orlebeke | 205/701 |
| 6,849,178 B2 | 2/2005 | Hecking | 210/205 |
| 6,923,901 B2 | 8/2005 | Leffler et al. | 205/701 |

FOREIGN PATENT DOCUMENTS

| | | |
|---|---|---|
| DE | 4330518 A1 | 3/1995 |
| DE | 69021388 T2 | 1/1996 |
| DE | 10046959 A1 | 4/2002 |
| EP | 0701972 A1 | 3/1996 |

* cited by examiner

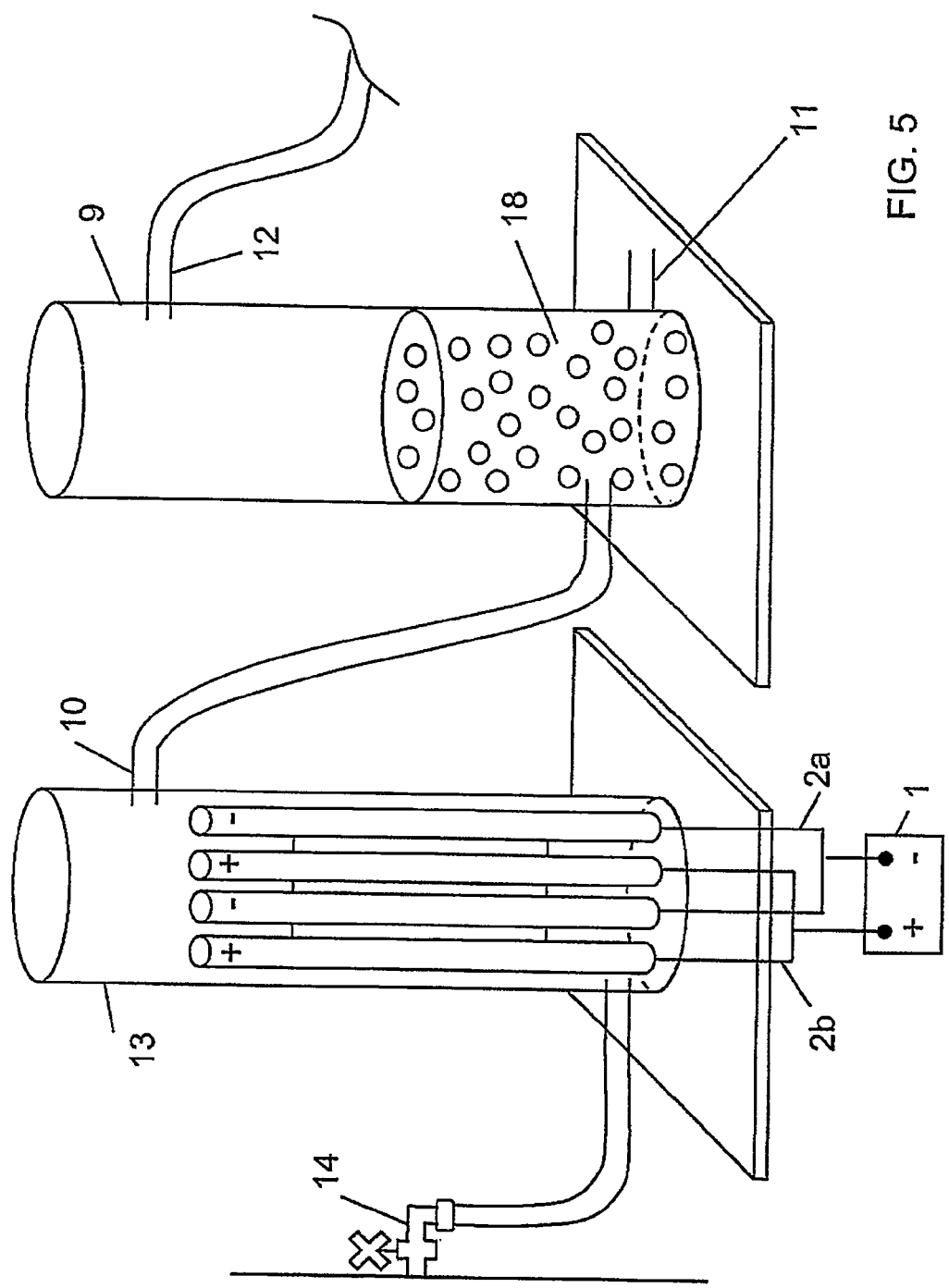

APPARATUS FOR TREATING WATER OR WASTEWATER

FIELD OF THE INVENTION

The present invention relates to a method and apparatus for treating water or wastewater or the like. More particularly, the present invention relates to an electro-physical precipitation manner of treating wastewater. Most particularly, the present invention relates to a method and apparatus for water or wastewater or the like treatment and softening, including pre-treating of water or wastewater and the like.

BACKGROUND OF THE INVENTION

The industry and tradesmen are under obligation, to avoid polluting the waste water whenever possible or, on the basis of §7a Section 1 Sentence 4 of the Federal Water Act, if the waste water contains hazardous substances, to clean up the waste water on the basis of the state of technology. In the Recycling Management and Waste Act, the avoidance of waste has the highest priority.

The increasing demands on industry and municipalities with regard to wastewater treatment plants do not only create greater volumes of wastewater to be treated and sewage sludge to be disposed off, but often also cause problems with regard to the characteristics of the sludge and make the competent disposal of the waste more difficult. For example, the separation of the sludge in many municipal wastewater treatment plants has significantly decreased since the phosphate elimination has been started.

Innovative processes for waste water and sludge treatment as well as the raising of the efficiency of mechanical treatment plants are thus gaining more and more in importance through the increase in the streams of waste in many areas of environment and process engineering. The difficulties arising in the exploitation/disposal of waste require always improving conditioning and treatment processes in order to reduce the amount of waste and even to recover materials.

Therefore, pre-treatment processes are necessary that enable the separation of the colloid components through filtration and sedimentation for economic and ecological reasons. Contaminates are often suspended in the wastewater and very finely emulated and distributed. In such systems the alignment of the negative charge of the particles in the same direction has a disadvantageous effect, which make the efficient separation in mechanical installations more difficult and necessitates the use of chemical additives, such as polymeric and/or organic flocculation agents.

The pre-treatment of these waste streams can alternatively be carried out using electro-physical precipitation. In that case the electrically charged particles are moved in the electrical field to the electrodes, neutralised there and thus the coagulation of the particles effected. Depending on the wastewater composition additional oxidation processes may result in the removal of certain water content substances during the application of the electro-chemical process. The knowledge of the mechanism of the various reactions is thus of particular importance for the optimisation of the process and for the adjustment to the special requirements in the case of the substance systems to be treated. Therefore the consideration of the electro-chemical theory, on which this is based, is of particular importance for the development of the process.

Some examples of prior art documents, which may relate to the background of the present invention, are briefly described herein for discussion purpose.

U.S. Pat. No. 6,55,977 briefly teaches in one aspect an electrolytic purification method and apparatus for treatment of wastewater to reduce chemical oxygen demand, by oxidation of water-soluble organic and other oxidizable materials contained therein. The electrolytic purification system of the invention utilizes one or more electrochemical cells. The cells employ stainless steel electrodes and contain iron chips, which are mobile and circulate freely as liquid flows through the cell. The iron chips are in electrical contact with the anode and are prevented from making contact with the cathode by a non-conductive but liquid-permeable barrier. The iron chips thus provide a dynamic and fluid electrode surface that is efficient and resistant to performance degradation.

This invention relates in another aspect to an electrolytic oxidation apparatus, comprising two or more electrochemical cells, arranged in series for sequential flow of wastewater there through to affect the desired level of COD removal. In one specific embodiment, the invention relates to an electrolytic oxidation process for purifying a wastewater stream by oxidation of water-soluble organic and oxidizable inorganic substances contained therein.

U.S. Pat. No. 6,325,916 briefly teaches a method for separating contaminants from a aqueous source containing contaminants. In one embodiment, the method involves the use of a high powdered oxidant dissolved within the aqueous system. The gas is dissolved within a reservoir in the aqueous solution and the pressure within the reservoir is controllable. This allows maximum contact of the oxidizing dissolved gas with the contaminant material. Once oxidized, the outlet of the reservoir is adapted to permit hydraulic cavitations. The net effect of the cavitations is to induce a foam formation which foam transports a floc into a separate phase from the aqueous solution. In this manner, the process is effectively a dissolved oxidizing gas mass transfer process. In another embodiment, the process may be augmented by electrocoagulation. This involves the use of an electric cell which is disposed within the reservoir containing the oxidant material. By providing electrodes and exposing the electrodes to a source of current, the contaminants within the aqueous solution are either oxidized or otherwise degraded and this complements the oxidation by the dissolved gaseous oxidant.

U.S. Pat. No. 6,740,245 briefly teaches an invention to provide extremely efficient, low maintenance, low energy cost modular water purification and contamination control technology for the non-chemical disinfection and contaminant separation of various types of water or wastewater streams. The water treatment and purification areas of particular interest include, but are not limited to, drinking water, ship ballast water, marine discharge wastewater, commercial and industrial cooling water, industrial and commercial hazardous and/or toxic effluents, manufacturing process water, industrial machine tool coolants, sewage, and agricultural and food processing streams.

Specifically, the non-chemical water purification and disinfection technology of the invention exhibits higher treatment efficiency than more conventional water treatment methods that rely on chemicals, traditional filtration, reverse osmosis, ozone generators, etc, and also involves reduced energy costs. By eliminating the treatment chemicals, increasing sub-micron particle size solids separation and removal, and by very efficient destruction of bacteria and biological agents within the treated water through electrically-driven disinfection; a number of operational, maintenance and serious health and water treatment problems can be eliminated, resulting in the economic recovery of contaminated water, and ultimately in conservation, purification, and protection of shrinking drinking water supplies. Accordingly, it is the object of the this invention to establish non-chemical water treatment disinfection and purification technologies that represent realistic, "user friendly", and cost effective answers to global water availability issues and concerns.

U.S. Pat. No. 4,149,953 briefly teaches a treating chamber operable as an electrolytic cell is provided, in which the electrodes have large surface areas relative to the volume of the electrolyte. The anode is composed of a quantity of aluminum particles and the cathode is composed of a quantity of iron particles disposed in close proximity to the aluminum. Wastewater containing impurities is introduced into the treating chamber and utilized as the electrolyte. An electric current is applied to the electrodes to dissolve aluminum and iron, and produce floc in the treating chamber. The impurities in the water are adsorbed and retained by the floc. The wastewater may be continuously re-circulated from the treating chamber to a holding chamber, or may be moved across the aluminum and iron electrodes in a continuous flow-through system at a predetermined flow rate. The floc containing the adsorbed impurities is separated from the water by conventional means. As an alternative, clean water containing normal dissolved solids may be introduced into the treatment chamber and utilized as the electrolyte. An electric current is applied to the aluminum and iron electrodes to produce floc. Floc-laden clean water is conveyed to a chamber containing wastewater, and mixed therewith. Floc containing impurities adsorbed from the wastewater then is separated from the water by conventional means.

U.S. Pat. No. 6,793,801 briefly teaches a method and apparatus for contaminant separation utilizes an interleaved array of oppositely charged electrode plates for fluid treatment. Spacing between the parallel electrode plates is graduated so that the volume of the cavities between the opposing electrodes provides varying levels of treatment of a broad range of contaminants from a variety of fluid columns. A fluid flow path extending substantially orthogonal to the direction of the electrical field established between opposing electrode plates provides a feed stream with exposure to the varying levels of electrical charges between the electrode plates. The method and apparatus provides an effective means of contaminant separation by a device having a small footprint and requiring low amounts of electrical energy.

U.S. Pat. No. 6,923,901 briefly teaches an invention to provide extremely efficient, low maintenance, low energy cost modular water purification and contamination control technology for the non-chemical disinfection and contaminant separation of various types of water or wastewater streams as encountered in the marine industry. The water treatment and purification areas of particular interest include, but are not limited to, ship ballast water and marine discharge wastewater. Specifically, the non-chemical water purification and disinfection technology of the invention exhibits higher treatment efficiency than more conventional water treatment methods that rely on chemicals, traditional filtration, reverse osmosis, ozone generators, etc, and also involves reduced energy costs. By eliminating the treatment chemicals, increasing sub-micron particle size solids separation and removal, and by very efficient destruction of bacteria and biological agents within the treated water through electrically-driven disinfection, a number of operational, maintenance and serious health and water treatment problems can be eliminated, resulting in the economic disinfection of ballast water and the like and thus avoiding spread of nonindigenous species. Accordingly, it is the object of the this invention to establish non-chemical water treatment disinfection and purification technologies that represent realistic, "user friendly", and cost effective answers to global water issues and concerns, particularly in the marine and maritime-related industries.

U.S. Pat. No. 6,613,201 briefly teaches an apparatus for treating water by means of an electric field. An Anode and a cathode are arranged in a treatment chamber. The cathode has a plurality of parallel pins. Seed crystals are deposited on these pins. There are means for separating these seed crystals from the pins. The apparatus is to be of simple design and is to have high efficiency with regard to the formation of seed crystals. The cathode is to be kept free from lime depositions. To this end, the seed crystals are separated or stripped from the pins by means of a perforated disc. The pins extend through the holes of this perforated disc. The perforated disc is guided over the pins. The perforated disc can be moved by water pressure or by an electric motor. The electric motor has as second function the actuation of a safety valve controlled by a monitoring device.

U.S. Pat. No. 6,849,178 briefly teaches an apparatus for water treatment by means of an electrical field is provided with an anode and a cathode in at least one treatment chamber through which the water to be treated passes. The apparatus is characterized in that the at least one treatment chamber forms a prismatic space with an elongated cross section, the anode and the cathode are formed by pairs of parallel, stick-shaped electrodes which extend spaced apart into said space and a voltage is applicable between the electrodes. One end of the at least one treatment chamber is connected to a water inlet and the other end of the at least one treatment chamber is connected to a water outlet, whereby a waterflow from one electrode to the other is generatable which is substantially transverse to the longitudinal axes of the electrodes.

U.S. Pat. No. 6,122,599 briefly teaches an apparatus for analyzing particles suspended in a fluid. The fluid has electrical properties different from that of the particles. The fluid and particles move from a first fluid containing portion to a second fluid containing portion through a conduit or aperture. A first pair of electrodes, each electrode of the pair being in a respective fluid containing portion. A constricted electrical path is defined between the first and second electrodes, and the path extends along the aperture. At least one other pair of electrodes is positioned in a non-encircling arrangement, and is aligned with each other and transverse to the constricted electrical path. This configuration eliminates many common errors susceptible to other devices.

U.S. Pat. No. 6,338,789 briefly teaches an apparatus for treating water by means of an electric field. An anode and a cathode are arranged in a treatment chamber. Seed crystals are deposited on the anode and are stripped there-from to be carried along with the water, which cause crystallization thereon of carbonates contained in the water. Thereby formation of boiler scale, when the water is heated, is reduced. The water from the treatment chamber is exposed to another electric field in an after-treatment chamber for a dwell time longer than the dwell time in the treatment chamber. Thereby, the growth of the seed crystals is enhanced. The efficiency of a treatment chamber with after-treatment is higher than the efficiency of the treatment chamber alone.

U.S. Pat. No. 4,104,142 briefly teaches a liquid containing suspended solids is first passed through an electrostatic treater, having no current flow across its electrodes, to initiate nucleation and coagulation of the particles. Thereafter, it passes through an electrolytic treater wherein current may flow between the electrodes to further encourage coagulation to such an extent that flocculation begins. The residual effects of the electrostatic treater prevent plating out on the electrodes of the electrolytic treater such that electrolysis can occur without sacrificing an electrode, and the electrodes are so arranged that the liquid passes sequentially through groups of concentrated lines of force whose repetitious, powerful action further encourages flocculation. From the electrolytic treater, the liquid with its flocculated material is delivered into a clarifying basin so designed that the floc will settle out and be removed from the basin with a minimum of manipulation because of the tendency of such material to immediately dissipate and disperse when handled while still in the liquid.

U.S. Pat. No. 3,944,478 briefly teaches an electrolytic drainage treating apparatus is provided to treat a drainage containing a suspension of contaminated compound whereby the suspension is flocculated and removed by aluminum ions or iron ions eluted by electrolysis. The electrolytic drainage treating apparatus is equipped with a high-speed electrolyzer comprising an anode and a cathode having a thin gap therebetween through in which a drainage is forcibly passed as an electrolytic solution. The anode material such as aluminum and iron is eluted as ions by the electrolysis caused by passing electric current across the gap. The width of the gap between the anode and the cathode is controlled. The high-speed electrolyzer is effectively used for various electrolytic treatments.

U.S. Pat. No. 6,689,271 briefly teaches an electrocoagulation system for removing contaminants from waste effluents comprising an electrocoagulation reactor having charged and uncharged plates and allowing serial flow of water therethrough. The reactor is connected to a voltage source to charge some of the plates positive and some negative, with uncharged plates between the positive and negative plates. The system allows wastewater to enter the reactor for coagulation therein, the waste water leaving the reactor to enter a defoam tank for agitation which allows trapped bubbles to rise to the surface of the tank as foam. From the defoam tank, waste water goes through a sludge thickener, to allow sludge to settle at the bottom thereof and waste water is drawn off from the sludge thickener to flow to a clarifier. The pump removes sludge forming at the bottom of clarifier to take it back to the sludge thickener. The sludge is drawn-out the bottom of the sludge thickener for transport to a press where most of the water is removed there-from. Water is drawn off the top of the clarifier for transport to a conventional sewer system, or for reuse.

U.S. Pat. No. 6,315,887 briefly teaches a device for the purification of polluted water, especially adapted to remove there-from organic pollutants. The device makes use of a reactor wherein the polluted water is subjected to the combined action of an ozone containing gas in the presence of an oxidation reaction catalyst that is produced in-situ by electrolysis. An object of the invention to provide an efficient and economic method for the purification of polluted water, especially waste water, by either oxidation "in-situ" of its organic contaminants and/or combination thereof in a physically removal form. This method also permits to kill contaminating living pollutants such bacteria and virus. It is another object of the invention to provide a device for carrying out the aforesaid method. This device can be used for the purification of polluted water contaminated with a large variety of pollutants such as those found in the effluent of many organic processing plants. Thus, it becomes possible to achieve the treatment of water polluted with organic compounds, especially organic compounds found in the effluent of many polluting industries like petrochemicals, fertilizers, insecticides, pesticides, or in paper mills and food industries, which generally contain high COD and BOD level. It is a further object of the invention to provide a reactor in which high oxidizing conditions are generated so as to fully or partially break down organic pollutants and transform them into easily removable oxidation products, especially oxidation products having a low density or gas. Thus; this invention provides a method and a device, which permit to purify heavily polluted water. The method and device according to this invention are devised to oxidize the organic contaminants contained in the wastewater that is treated and to produce during the treatment at least one catalyst of oxidation reaction in a very activated state.

U.S. Pat. No. 6,294,061 briefly teaches an electrocoagulation system for removing contaminants from waste effluents comprising an electrocoagulation reactor having charged and uncharged plates and allowing serial flow of water therethrough. The reactor is connected to a voltage source to charge some of the pates positive and negative plates. The system allows wastewater to enter the reactor for coagulation therein, the waster water leaving the reactor to enter a defoam tank for agitation which allows trapped bubbles to rise to the surface of the tank as foam. From the defoam tank, waste water goes through a sludge thickener, to allow sludge to settle at the bottom thereof and wastewater is drawn off from the sludge thickener to flow to a clarifier. The pump removes sludge forming at the bottom of clarifier to take it back to the sludge thickener. The sludge is drawn out the bottom of the sludge thickener for transport to a press where most of the water is removed there-from. Water is drawn off the top of the clarifier for transport to a conventional sewer system, or for reuse.

U.S. Pat. No. 6,274,028 briefly teaches a method and apparatus for purifying aqueous effluent streams to reduce chemical oxygen demand thereof, where the method comprises direct oxidation of water-soluble organic material in an electrochemical cell that incorporates stainless steel electrodes, whose stability and lifetime are enhanced by inclusion of circulating metal chips.

U.S. Pat. No. 6,126,838 briefly teaches a method for treating highly concentrated wastewater by electrolysis and oxidization, said method being characterized in that the electrolysis and oxidization are carried out in a fluidized bed of a suitable particulate carrier. The electrolytic reduction efficiency of ferric ions is improved by the fluidized particulate carrier; and thus a high proportion of iron (III) to iron (II) can be sustained in the system. This invention allows extensive purification of wastewater with improved efficiency.

U.S. Pat. No. 5,928,493 briefly teaches a process for the treatment of industrial waste water using electrocoagulation to effect separation of contaminants, which may include heavy metals, dyes, oils, fats, solvents, and salts. The process comprises passing waste water containing contaminants susceptible to electrocoagulation between pairs of electrodes within a reactor cell, energizing the electrodes with direct current, thereby breaking down and chemically altering contaminants in the electrolyzed water to form a sedimentable flocculate therein; and separating the flocculate from cleaned water. This invention also anticipates an apparatus for treating waste water which comprises: an electrocoagulation reactor cell having spaced-apart electrodes energized by direct current, a pump for passing industrial waste water through the reactor and between the electrodes, a de-foam tank, a mechanical clarifier, and a recessed-plate filter press.

U.S. Pat. No. 4,770,755 briefly teaches an electrode unit to be used for purification of emulsions and polluted waters, especially oil-bearing waters, by electrolysis which comprises vertically placed adjacent electrode plates of a soluble material, spacers for adjusting the distance between the electrode plates and equipment for adjusting the depth of immersion of the electrode plates. The tips of the electrode plates defines the only area of the plates in contact with the liquid to be purified and the depth of immersion of the electrode plates is adjusted in order to keep the current density between the electrode tips within a desired area. In addition, the space in between the plates is also adjusted in order to keep the current density between the electrode tips within the desired area.

U.S. Pat. No. 4,623,436 briefly teaches a method and apparatus for removing impurities from a liquid, the liquid containing impurities is supplied to an electrolytic bath at a pressure higher than atmospheric pressure. Electrolysis is performed by applying a voltage to electrodes consisting of a metal, which easily dissolves upon electrolysis. The liquid is then exposed to atmospheric pressure, and is treated in a flotation separation tank. Fine bubbles formed during the treatment of the liquid in the flotation separation tank attach to the impurities flocculated in the liquid by electrolysis. The flotation separation of the flocculated impurities is performed very efficiently, and high-purity water can be recovered. The apparatus comprises an electrolytic bath consisting of a pressure vessel, in which electrodes of a metal which easily dissolves upon electrolysis are housed, and a constant current source for applying a voltage to said electrodes so as to obtain a predetermined current density in a liquid contained in said electrolytic bath, wherein impurities in the liquid are caused to flocculate by a hydroxide of the metal.

U.S. Pat. No. 4,181,591 briefly teaches a fluid, such as air or water, carrying suspended solids is directed between a pair of oppositely charged, corrugated surfaces in order to subject the flow to an undulating action that increases the frequency with which the solid particles impinge against one another, thereby increasing the rate of flocculation of the solids. In the case of airborne particles, the corrugated surfaces are arranged in an upright condition so that the flocculated particles attracted to one or the other of such surfaces gravitate there-from into a conveying mechanism that delivers such particles to a collecting receptacle. In the case of liquid-borne particles, the flow is forced to travel upwardly against the force of gravity after passing between the surfaces, thereby encouraging the flocculated particles to settle out into a sump that is associated with the uphill flow passage. In each case, two sets of charged surfaces may be utilized, the first having at least one of its surfaces insulated from the flow for electrostatic action only, while the second has neither surfaces so insulated for electrolytic action.

Additional to the above-mentioned prior arts, there are also several other prior art which basically relates to the background of the present invention such as DE 69021388 T2, DE 10046959 A1, DE 4330518 A1, 5474748 A and EP 0701972 A1.

Any discussion of documents, devices, acts or knowledge in this specification is included to explain the context of the invention. It should not be taken as an admission that any of the material forms a part of the prior art base or the common general knowledge in the relevant art in Singapore or elsewhere on or before the priority date of the disclosure and claims herein. All statements as to the date or representation as to the contents of these documents is based on the information available to the applicant and does not constitute any admission as to the correctness of the dates or contents of these documents.

In the electro-physical precipitation the present inventor(s) have found a separation process, which is clean, cost effective, comfortable and quick. Until now stable emulsions and suspensions required complex pre-treatment, before the individual phases could be treated. For example, emulsions such as drilling or cutting oil or wastewater from washing processes are often broken down through the addition of chemicals such as metal salt or polymers. The disadvantage of this procedure lies in the fact that metal salts cause salt accumulation. Another process is the emulsion separation through ultra-filtration. This process delivers an almost oil-free filtrate, which can be fed into the biological treatment. However, its acquisition as well as operation is relatively expensive. The same applies to thermal and thus energy-intensive separation processes. In contrast to the traditional routes, the electro-physical precipitation takes the direct path that covers the environmentally friendly cleaning of problematic wastewater or pre-treatment of water or wastewater for subsequent desalination.

Therefore, it is an objective of the present invention to introduce a so-called sacrificial anode, which will be slowly dissolved by sending metal ions into a liquid medium on the way to the cathode.

It is yet another objective of the present invention to generate highly reactive radicals as well as hydrogen and oxygen at the surface of the electrode. In particular, the radicals entail numerous secondary reactions with content materials of wastewater, as for example the degradation of organic substances through oxidation. This also reduces the chemical need for oxygen.

It is yet another objective of the present invention to generate the many-facetted areas of application of the electro-physical precipitation such as splits drilling and cutting oil emulsions as well as chalk and plaster suspensions. It eliminates heavy metals from galvanic wastewater. It can also be advantageously used for pre-treatment of water or wastewater in desalination process.

Some advantages of the present invention are that the required space is small and the equipment expenditures low. No hazardous materials in the form of chemicals have to be stored and the operating costs are limited. The distance between the electrodes has been optimized with regard to a large surface per reactor volume. The voltage is comparatively low, which has a beneficial effect on the energy consumption. The wear and tear of the iron-aluminum or alloy-coated electrodes that serve as sacrificial anodes is also kept within modest limits.

SUMMARY OF THE INVENTION

The present invention relates to a method and apparatus for treating water or wastewater for drinking and/or industrial use. The method and apparatus comprises of a plurality of vertically positioned electrodes, which are placed in a treating chamber. The said electrodes are interconnected to one another but are insulated there-between. The polarity of the direct current supply could be changed at regular intervals in order to prevent a passivation of the electrodes in order to reach an even abrasion. The current can preferably be pulsatory, whereby the tip effect becomes more efficient and in order to be able to keep the current density between the electrodes at a desired value, the most efficient possible electrolysis is achieved by means of a minimum total current. The spacing between the electrodes is adjustable for different types of water or wastewater conductivity.

An electrostatic rod and some ultraviolet disinfector lamps could be further included for better coagulation. An injector system, which sucks air, gas or a liquid coagulant chemical into the reactor room are provided therein. The electrodes, which are positioned in a treating chamber is separated by a wall. Further to this, an electrode unit is integrated in a micro flotation system and the flocculated sludge at the outlet is collected in a filter drum and wherein the clear water at the outlet is returned after pH test and thereafter channeled to the drain. For increasing the micro flotation process, an air injector for gas can be optionally installed in front of the inlet.

According to the present invention the wastewater flows into a plastic, such as a Plexiglas, glass or metal reactor tube, in which the electrodes starts the reaction of flocculation colloid particles and the oxidation of water soluble organic material in the electrochemical cell. The coagulated and oxidated material will thereafter go into the settlement reactor were minerals as well as flocculated colloids drops to the bottom of the settlement reactor and creates a kind of filter bed in the water itself. The treated clear water has to go through this mineral filter bed, which can be removed from time to time at the outlet.

The positive electrode is composed of several individual electrodes and are designed and selected from a square, hexagonal, circular or of any other geometrical shapes in cross section and wherein each positive electrode is preferably at least 1 to 20 square centimeters in size and between 0.30 meters to 3.00 meters in length and wherein the surface of the positive electrodes comprises of a coated layer of titanium or molybdenum or an alloy of both metal or diamante-coated niobium electrodes.

Other aspects and preferred aspects are disclosed in the specification and/or defined in the appended claims, forming a part of the description of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention, and in which:

FIG. 5 shows a schematic view of an electrode unit for demineralization/deionzation by electrolytical treatment of water/wastewater.

DETAILED DESCRIPTION OF THE PRESENT INVENTION

Figure 1:
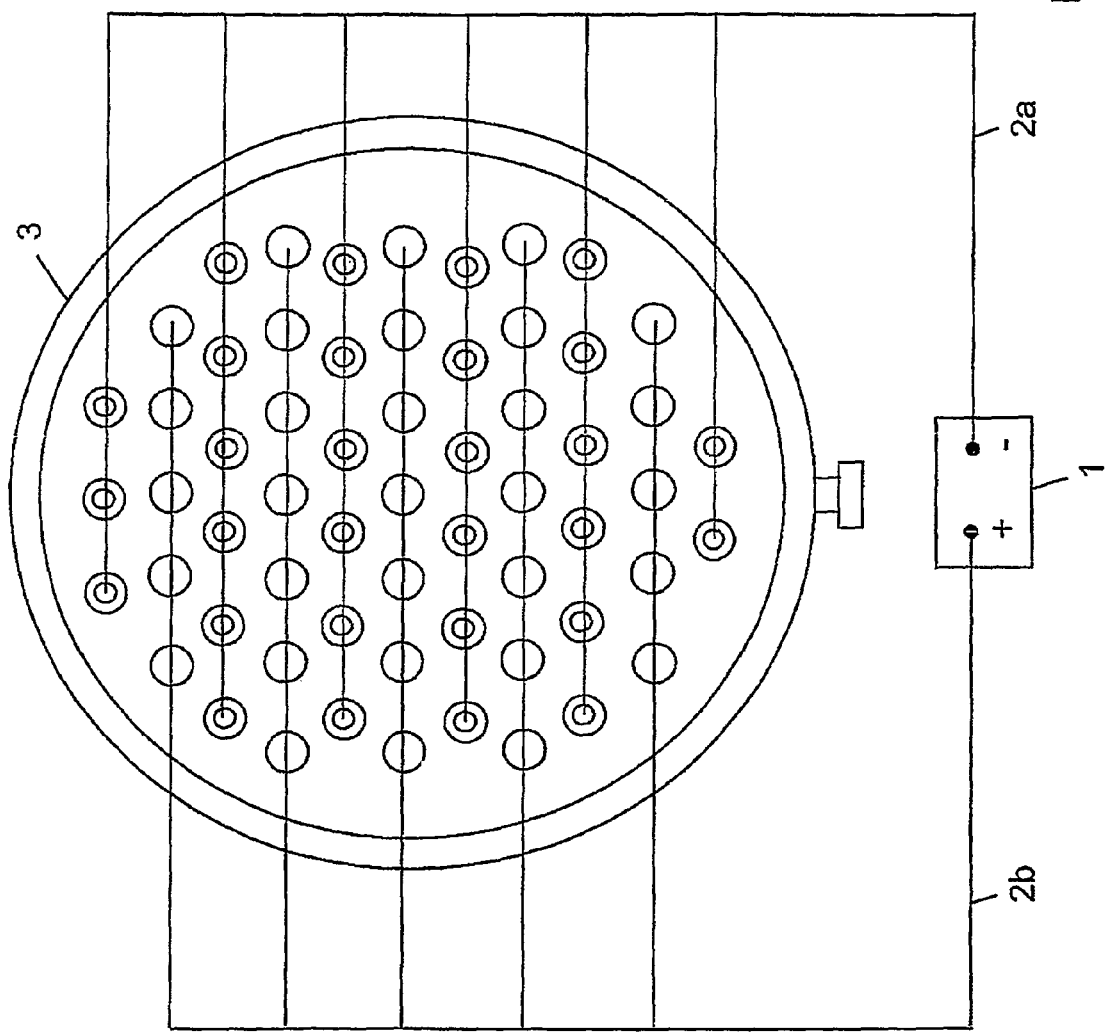
FIG. 1 shows a schematic plan view of an electrode unit according to the present invention.

FIG. 1 shows schematic drawings of an electrode unit 1 according to the present invention. Said electrode unit 1 comprises of a plurality of vertically positioned electrodes 2a and 2b. Said vertically positioned electrodes 2a and 2b are preferably positioned in a treating chamber 3. The electrodes 2a and 2b are interconnected to one another as shown in the drawings but the positive and negative electrodes are insulated there-between. As shown in the figure, the polarity of direct current supply could be changed at regular intervals in order to prevent passivation of the electrodes when reaching even abrasion. Additionally, the current could be preferably pulsatory, whereby the tip effect becomes more efficient than before. According to the present invention, in order to be able to keep the current density between the electrodes at a desired value, the most efficient possible electrolysis is achieved by means of a minimum total current. Further to this, the spacing between the electrodes could also be adjusted, within a distance of 4 to 40 mm for the same purpose.

Referring again to FIG. 1 wherein the electrode unit 1, can be used in an electrolytic phosphate-removing procedure together with the electro-phosphate remover in wastewater treatment plants. The electrodes 2a and 2b, connected to the electro-phosphate remover, could be fitted in the upswing-basin, in which there is more nitrate compared to oxygen. However, if the material is well mixed, calcium would not react with oxygen. The electro-phosphate remover causes an ion exchanging reaction. This would further cause the formation of a crystal like fence structure. In this event, the subsequent process of dinitrification of the phosphate as calcium-ammonium and/or magnesium-ammonium-phosphate, which would float on the sludge, is eliminated.

Figure 2:
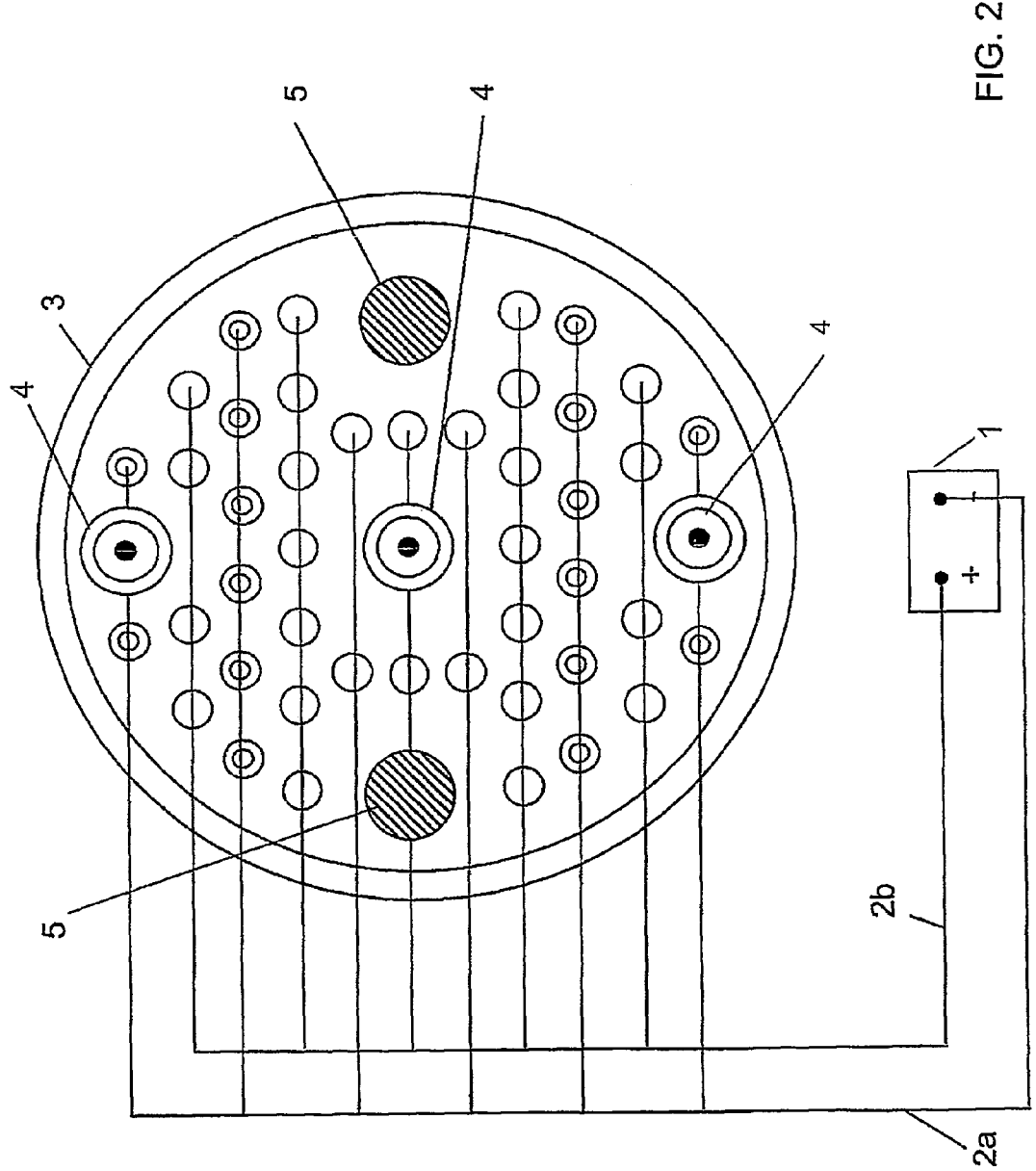
FIG. 2 shows a schematic view of an electrode unit in combination with electrostatic field rods for better coagulation and or ultraviolet light for disinfecting.

Reference is made now to FIG. 2 wherein is shown a schematic view of another electrode unit according to the present invention, which further comprises of several vertically placed electrodes 2a and 2b. Said electrodes 2a and 2b are preferably positioned in a treating chamber 3. Other configuration of this electrode unit is identical to the earlier mentioned electrode unit and therefore would not be repeated herein. According to the present invention an electrostatic rod 4 such as niobium and some ultraviolet disinfector lamps 5 could be further included for better coagulation.

Figure 3:
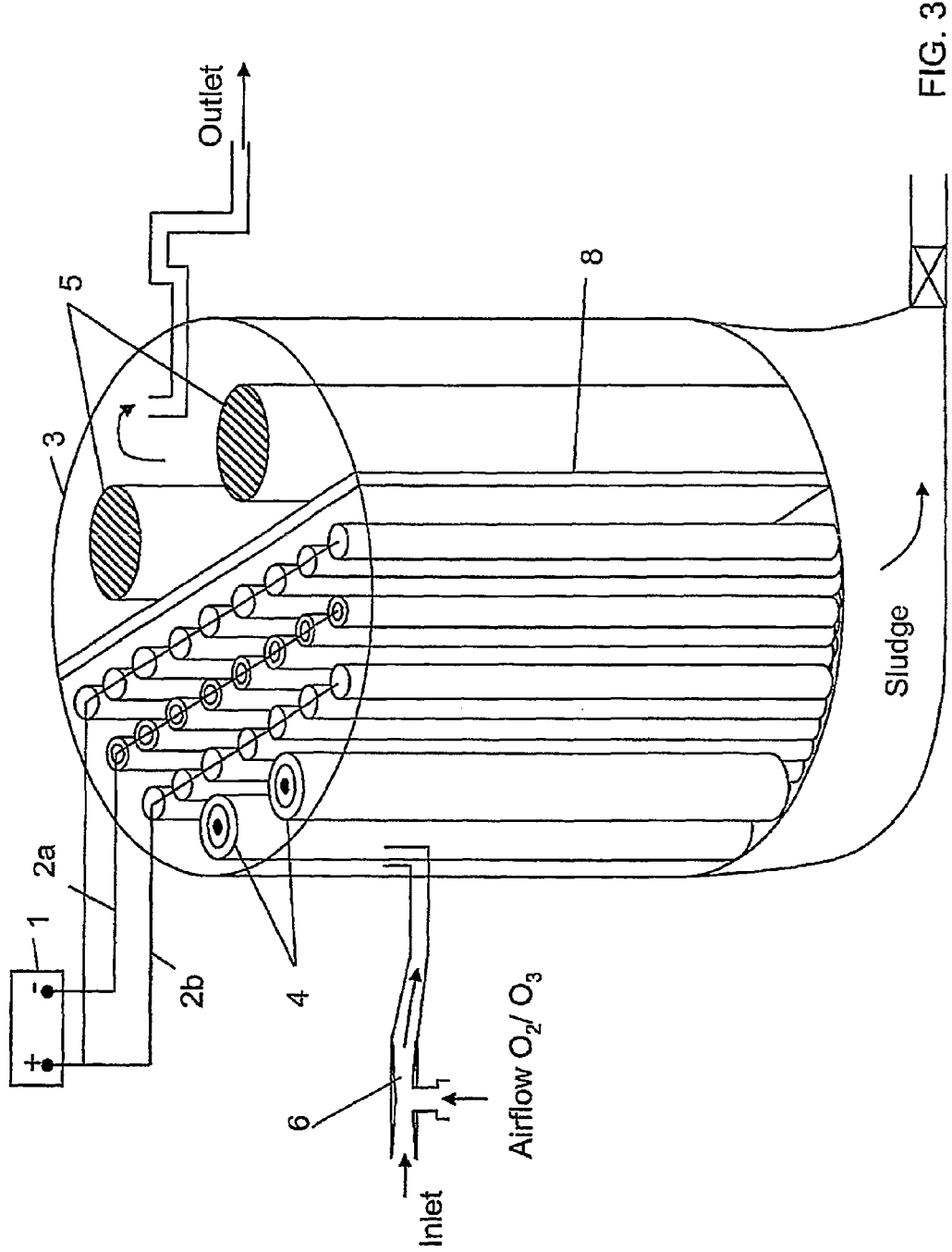
FIG. 3 shows a schematic representation of a combination of air/gas/liquid coagulant injector with an electrostatic high voltage rod unit with electrolytic unit in combination with ultraviolet lamps for best disinfection.

According to the present invention as shown in FIG. 3 wherein there is further provided an injector system 6, which is designed and configured to sucks air, gas or a liquid coagulant chemical into the reactor room. In this embodiment a wall 8 separates the electrodes 2a and 2b, which are positioned in a treating chamber 3. Due to this treatment, the values of chemical oxygen demand (COD) and biological oxygen demand (BOD); and the amount of colloid particles are reduced. This embodiment is particularly use in air-conditioning and cooling tower.

Figure 4:
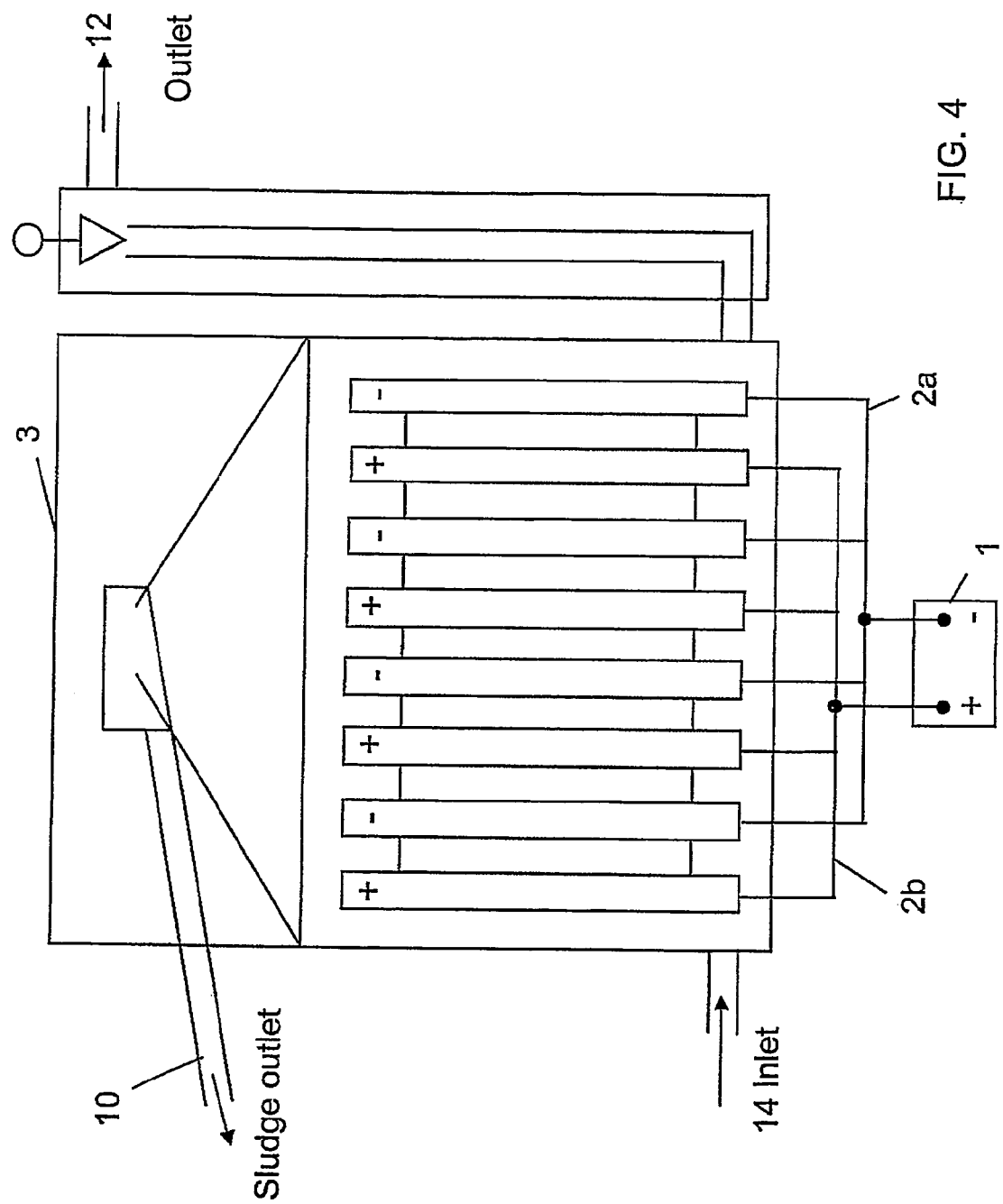
FIG. 4 shows a schematic representation of an electrode unit/rods inside of a microflotation system to reduce chemical oxygen demand (COD), biological oxygen demand (BOD) colloid particles and disinfection.

FIG. 4 according to the present invention shows a schematic drawing of an electrode unit integrated in a micro flotation system. The flocculated sludge at the outlet 10 is collected in a filter drum. The clear water from the outlet 12 is tested for its pH value and is thereafter channeled to the drain. To increase the micro flotation process, an air injector for gas could be optionally installed in the front portion of the inlet 14.

FIG. 5 shows a schematic drawing of an electrode unit according the invention for deionization water or wastewater. Water from a water tap or tank or from any other is channeled into a plastic such as Plexiglas, glass or metal reactor tube 13. The electrodes 2a and 2b starts the reaction to flocculate colloid particles and the oxidation of water soluble organic material in the electrochemical cell. Due to the electrochemical reaction, the coagulated and oxidated material will move towards the settlement reactor 9 where calcium, magnesium and other minerals as well as flocculated colloids 18 will sink to the bottom of the settlement reactor 9 and thereafter creating a kind of filter bed in the water itself. The treated clear water has to go through said filter bed, which can be removed from time to time via the outlet 11. The arrangement shown in the FIG. 5 is especially used when deionized water is needed for processing, for example in the food industry, cooling towers, water heater and so on. According to the present invention, the carbonate hardness of water that is to be treated can be effectively reduced through electrolytic method. The volume of heavy-fleeting lipophilen materials in sewage, especially from food-fats and food-oils are reduced by using the present invention.

According to the present invention, the carbonate hardness of water that is to be treated can be effectively reduced through electrolytic method, which would precipitate carbonate and sulphate salts by using an electrolysis cell. Said electrolysis cell utilizes 10 volt of DC voltage. The electrolysis cell is also designed to pulsate the DC voltage in order to generate a current strength that is at least 10 Amperes. In the present invention, the electrodes are designed and configured to be approximately 1 to 2 square centimeters in cross-section dimension. Thus, the water to be treated is treated with a current strength of approximately 1 to 20 Amperes per square meters.

The anode (also known as positive pole) comprises of several individual anodes. It is preferred that each anode are designed and selected from a square, hexagonal, circular or of any other geometrical shapes in cross section. It is also preferred that each anode is at least 1 to 20 square centimeters in dimension. The length of each anode is selected to be between 0.30 meters to 3.00 meters. In the present invention, the surface of the anodes comprises of a layer coated with titanium or molybdenum or an alloy of both metal or diamante-coated niobium. The combination of anode having different materials can be varies according to the properties of the water to be treated and the required water quality.

The cathode (as known as negative pole) is also composed of several individual electrodes. The design and configuration of each cathode is similar to the design and configuration of each anode. The characteristics of the cathodes are manufactured by using the following composition:
  (i) Metals or metal alloys with at least 80% of aluminum
  (ii) Metals or metal alloys with at least 80% of magnesium
  (iii) Metals or metal alloys with at least 80% of total combination of aluminum and magnesium
  (iv) Conductive carbon in the form of graphite or compacted soot
  (v) Conductive carbon, which is embedded in plastics
  (vi) Diamante-coated niobium electrodes
  (vii) Conductive ceramic or mixtures of ceramic with other materials According to the present invention, the group of materials on the basis of aluminum is less suitable for the treatment of drinking water. Therefore, for the purpose of treating drinking water, the group of metals or metal alloys with at least 80% of magnesium is preferred.

According to the present invention the carbonate hardness of the water is decomposed during precipitation. In addition to that various organic and inorganic substances such as bacteria, suspended matters, nitrates, nitrites, phosphates or ammonia salts are also decomposed into harmless components through oxidation or reduction, whish is also known as the redox reactions.

An essential aspect of the present invention is to use a material, which combines both anodes and cathodes. This will ensure that there would be a minimal electrochemical wear and tear on the electrodes. This in return would ensure that the lifespan of the electrolysis cells are extended for several years.

In accordance with the present invention, it is possible to conduct a water treatment method, which would make water available for both industrial use and for drinking. In addition to that, the water treated according to the present invention could be further enhanced into de-ionized water or drinking water respectively through traditional ion exchangers or by reverse osmosis methods.

An example of the test results obtain according to the present invention is shown herein in Table 1.

TABLE 1

Electrolytic waste water treatment Examples cleaning values

| Type of Waste Water | Ingredients | Waste Water (mg/l) | Filtrate (mg/l) | Reduction (%) |
|---|---|---|---|---|
| Mixing Emulsion | CSB | 38.000 | 7.200 | 81.1 |
|  | KW(H18) | 8.000 | 0.2 | 99.9 |
|  | Cu | 184 | 0.82 | 99.6 |
|  | 2n | 18 | 0.71 | 96.1 |
| Steeping Emulsion | CSB | 114.000 | 2700 | 97.6 |
|  | Cu | 98 | 0.34 | 99.7 |
| Washing water (Vehicles) | CSB | 1.930 | 868 | 55 |
|  | KW (H18) | 8.8 | 0.1 | 98.9 |
|  | KW (H17) | 15 | 8 | 46.7 |
|  | Zn | 3.6 | 0.34 | 90.6 |
|  | Pb | 2.31 | 0.54 | 76.6 |
| Washing water (Scrap Metal) | CSB | 24.400 | 2.870 | 88.2 |
|  | KW (H18) | 20.000 | 1.4 | 99.9 |
|  | Cr | 0.08 | 0.01 | 87.5 |
|  | Cu | 2.0 | 0.14 | 93 |
|  | Ni | 0.28 | 0.14 | 50 |
|  | Zn | 4.4 | 0.43 | 90.2 |
| Phosphatising | Fe | 5 | 0.2 | 96 |
|  | Zn | 17.5 | 0.2 | 98.2 |
|  | Ni | 27.5 | 0.1 | 99.6 |
|  | Sulfate | 1400 | 100 | 92.9 |
|  | Nitrite | 17.5 | 4 | 77.1 |
|  | Phosphate | 142.5 | 44.5 | 68.8 |
| Surface Finishing | CSB | 25.700 | 569 | 97.8 |
|  | Cr | 5.8 | 10.05 | 99.1 |
|  | Cn | 11.9 | 10.1 | 99.2 |
|  | Pb | 5.8 | 0.4 | 93.1 |
|  | Ni | 4.3 | 4.3 | 97.7 |
|  | Zn | 62 | 62 | 99.9 |
| Lead Oxide - production | Pb | 40 | 10.002 | 99.9 |
| Zinc Oxide - production | Zn | 1002 | 1 | 99.9 |
| Aluminum profile - production | Al | 80.2 | 0.41 | 99.4 |
| Print dye waste water | CSB | 9.98 | 653 | 93.5 |
|  | KW | 110 | 0.5 | 99.5 |
|  | AOX | 39 | 0.73 | 97.9 |
|  | Al | 213 | 0.05 | 99.9 |
|  | Cu | 153 | 0.02 | 99.9 |
|  | Zn | 27.7 | 0.01 | 99.9 |
| Print dye waste water | CSB | 18.000 | 4.035 | 27.6 |
|  | KW | 30 | 1.0 | 96.6 |
|  | AOX | 88.5 | 1.5 | 98.3 |
|  | Cu | 73 | 0.4 | 99.4 |
|  | Cr | 0.53 | 0.12 | 78.5 |
| Spectral Adsorption coefficient | 436 nm | 96.6 | 3.5 | 89 |
|  | 525 nm | 47.6 | 1.3 | 93.1 |
|  | 620 nm | 52.2 | 3.0 | 95.6 |
| Flexo print waste water | CSB | 17.500 | 932 | 94.7 |
|  | BSB | 1.000 | 333 | 66.6 |
|  | AOX | 7 | 0.1 | 98.6 |
|  | Cu | 1 | 0.01 | 99 |
|  | Ba | 13 | 0.07 | 99.5 |
| Dispersion dye waste water | CSB | 50.000 | 3.100 | 93.8 |
|  | Benzol | 0.25 | 0.003 | 98.7 |
|  | Toluol | 2 | 0.06 | 97 |
|  | Ethylbenzol | 17 | 0.13 | 99.2 |
|  | Xylol | 69 | 0.54 | 99.2 |
|  | Styrol | 5.4 | 0.04 | 99 |
| Textile dye shop | CSB | 1.700 | 230 | 86.5 |
|  | KW | 32 | 0.8 | 97.5 |
|  | Cr | 3.4 | 0.1 | 97 |

TABLE 1-continued

Electrolytic waste water treatment
Examples cleaning values

| Type of Waste Water | Ingredients | Waste Water (mg/l) | Filtrate (mg/l) | Reduction (%) |
|---|---|---|---|---|
| Textile dye shop | Tenside MBAS | 79.3 | 0.9 | 98.9 |
|  | Tenside BIAS | 24.5 | 1.6 | 93.5 |
|  | EDTA | 117 | 0.8 | 99.3 |
|  | Cr | 76.9 | 0.2 | 99.7 |
|  | Cu | 33.9 | 0.2 | 99.4 |
|  | Zn | 99.3 | 0.05 | 99.9 |
| Spectral Adsorption coefficient | 436 nm | 49.3 | 5.4 | 89 |
|  | 525 nm | 55.0 | 3.8 | 93.1 |
|  | 620 nm | 118 | 5.1 | 95.6 |
| Galvanic | Ar | 1.1 | 0.006 | 99.5 |
|  | Cd | 2.4 | 0.0001 | 99.9 |
|  | Cr | 11 | 0.1 | 99.9 |
|  | Cu | 190 | 0.01 | 99.9 |
|  | Hg | 0.8 | 0.0002 | 99.9 |
|  | Pb | 150 | 0.03 | 99.9 |
|  | Ma | 5.8 | 0.02 | 99.7 |
|  | Ni | 2.1 | 0.09 | 99.2 |
|  | Zn | 290 | 0.08 | 99.9 |
| Galvanic | Ni | 1156 | 0.25 | 99.9 |
|  | Cu | 111 | 0.08 | 99.9 |
|  | Zn | 50.4 | 0.01 | 99.9 |
| Slide Grinding | CSB | 21.000 | 630 | 97 |
|  | Cr | 6.2 | 0.06 | 99 |
|  | Ni | 4.7 | 0.2 | 95.5 |
|  | Fe | 37 | 3.3 | 91 |
| Slide Grinding | KW | 165 | 1.6 | 99 |
|  | ZN | 62 | 1.8 | 97 |
|  | Cu | 34 | 0.3 | 99.1 |
| Slide Grinding (de-filing) | CSB | 17.550 | 1720 | 90.2 |
|  | Cu | 26.7 | 0.36 | 98.7 |
|  | Zn | 11.8 | 0.21 | 98.3 |
| Slide Grinding (ball-polishing) | CSB | 13.720 | 1411 | 89.8 |
|  | Cu | 234.1 | 1.05 | 99.6 |
|  | Zn | 133.4 | 0.24 | 99.8 |
| Slide Grinding (Chemically accelerated) | CSB | 32.800 | 1620 | 95.5 |
|  | Fe | 401 | 2 | 99.9 |
|  | Zn | 0.54 | 0.01 | 99.9 |
|  | Phosphor | 5.7 | 0.5 | 99.9 |
| Mechanical production | BSB | 1.300 | 940 | 92.7 |
|  | Phosphor | 30 | 1 | 96.7 |
|  | Cu | 1.02 | 0.02 | 98 |
|  | Ni | 1.7 | 0.18 | 99 |
|  | Zn | 0.92 | 0.05 | 94.5 |
|  | KW | 3.500 | 0.39 | 99.9 |
| Surface Finishing | Cr | 863 | 1.04 | 99.9 |

It should be noted that the term water or wastewater used in the present description would include but not limited to sewage water, sea water, lake water, river water, industrial wastewater, domestic wastewater and the like.

The embodiment of the present invention may vary depending on the application. Exemplary application for use in the practice of the invention include, but are not limited to pretreatment of water or wastewater prior to desalination to remove particulates and to protect the downstream processes from damage or fouling. In reverse osmosis, electro-dialysis or the like, the water or wastewater is pretreated by channeling the water or wastewater into the apparatus of the present invention to remove particles that would clog the membranes. This is especially useful for treating of brackish water using reverse osmosis as reverse osmosis is very susceptible to the high content of silica present in the brackish water. As a result of better pretreatment, reverse osmosis membranes operate more effectively. In addition, the life span of the system will be extended due to minimize biofouling, scaling and membrane plugging.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

The invention claimed is:

1. An apparatus comprising an electrode unit for treating water or wastewater for drinking and/or industrial use the apparatus comprising: a plurality of positive and negative electrodes supplied with direct current placed vertically placed in a treating chamber, wherein the positive and negative electrodes are independently interconnected to one another but the positive and negative electrodes are insulated there-between, wherein the polarity of the direct current supplied to the electrodes is changed at regular intervals to prevent passivation of the electrodes and to even abrasion, wherein the spacing between the electrodes is adjustable, and wherein said apparatus comprises of one or more of each of electrostatic rods and ultraviolet disinfector lamps.

2. The apparatus as claimed in claim 1 further comprising an injector system which injects air, gas or a liquid coagulant chemical into the treating chamber.

3. The apparatus as claimed in claim 1 wherein the electrodes are separated by a wall from the ultraviolet disinfector lamps.

4. The apparatus as claimed in claim 1 wherein the electrode unit is integrated into a micro flotation system having an inlet, an upper outlet and a lower outlet and wherein flocculated sludge exists the upper outlet and is collected in a filter drum and wherein clear water exists the lower outlet, is tested for pH value, and is thereafter channeled to a drain.

5. The apparatus as claimed in claim 4 further comprising an air injector for gas installed at a front portion of the inlet.

6. The apparatus as claimed in claim 1 wherein atleast one positive electrode is comprised of a plurality of individual electrodes wherein each individual electrode is at least 1 to 20 square centimeters in cross-section and between 0.30 meters to 3.00 meters in length and wherein the surface of the individual electrodes is comprised of a layer selected from the group consisting of titanium, molybdenum, alloys of titanium and molybdenum, diamante-coated niobium, and combinations thereof.

7. The apparatus as claimed in claim 1 wherein atleast one negative electrode is comprised of a plurality of individual electrodes wherein each individual electrode is at least 1 to 20 square centimeters in cross-section and between 0.30 meters to 3.00 meters in length and wherein at least the effective surface of the individual electrodes is comprised of a material selected from the group consisting of:
(i) Metals or metal alloys with at least 80% of aluminium,
(ii) Metals or metal alloys with at least 80% of magnesium,
(iii) Metals or metal alloys with at least 80% of total combination of aluminum and magnesium,
(iv) Conductive carbon in the form of graphite or compacted soot,
(v) Conductive carbon, which is embedded in plastics,
(vi) Diamante-coated niobium electrodes,
(vii) Conductive ceramic or mixtures of ceramic with other materials, and combinations thereof 8. The apparatus as claimed in claim 1 wherein the plurality of positive and negative electrodes are each comprised of a plurality of individual electrodes wherein the individual electrodes are made of specific materials to target specific contaminant particles present in the water or wastewater.

9. The apparatus as claimed in claim 8 wherein some of the plurality of electrodes made of specific materials can be powered down after the target particle present in the source water is removed.

* * * * *